United States Patent [19]

Glenn

[11] Patent Number: 4,667,226
[45] Date of Patent: May 19, 1987

[54] HIGH DEFINITION TELEVISION CAMERA SYSTEM AND METHOD WITH OPTICAL SWITCHING

[75] Inventor: William E. Glenn, Fort Lauderdale, Fla.

[73] Assignee: New York Institute of Technology, Old Westbury, N.Y.

[21] Appl. No.: 782,201

[22] Filed: Oct. 3, 1985

Related U.S. Application Data

[63] Continuation-in-part of Ser. No. 661,656, Oct. 17, 1984, which is a continuation-in-part of Ser. No. 597,482, Apr. 6, 1984, which is a continuation-in-part of Ser. No. 483,126, Apr. 8, 1983, which is a continuation-in-part of Ser. No. 418,055, Sep. 14, 1982, Pat. No. 4,517,597.

[51] Int. Cl.$^4$ ............................................. H04N 5/225
[52] U.S. Cl. ...................................... 358/41; 358/12; 358/209
[58] Field of Search ....................... 358/11, 12, 41, 43, 358/50, 52, 85, 137, 140, 141, 142, 310, 199, 205, 206, 92, 209, 180

[56] References Cited

U.S. PATENT DOCUMENTS

| | | | |
|---|---|---|---|
| 3,037,564 | 6/1962 | Bruining | 358/209 |
| 3,449,509 | 6/1969 | Hobbs et al. | 358/52 X |
| 3,501,588 | 3/1970 | Elliott | 358/50 X |
| 3,586,763 | 6/1971 | Schneider | 358/52 |
| 3,624,285 | 11/1971 | Wolff | 358/83 |
| 4,068,258 | 1/1978 | Bied-Charreton et al. | 358/310 |
| 4,306,252 | 12/1981 | Fearnside | 358/206 |
| 4,485,401 | 11/1984 | Tan et al. | 358/141 |
| 4,517,597 | 5/1985 | Glenn | 358/12 |
| 4,581,648 | 4/1986 | Ganther | 358/211 |

FOREIGN PATENT DOCUMENTS

| | | | |
|---|---|---|---|
| 1946199 | 4/1970 | Fed. Rep. of Germany | |
| 1536232 | 12/1978 | United Kingdom | |
| 2135851 | 5/1984 | United Kingdom | 358/41 |

OTHER PUBLICATIONS

Glenn et al., "Compatible Transmission of High Definition Television Using Bandwidth Reduction", Proceedings, 37th Annual Broadcast Engineering Conference, 4/12/83.

Maxwell, "Cameras that Wink can Produce 3-D TV", Electronics, Mar. 18, 1968.

Primary Examiner—Michael A. Masinick
Attorney, Agent, or Firm—Martin M. Novack

[57] ABSTRACT

An apparatus and method for generating video signals using an improved camera system is disclosed. The camera system includes first and second video imaging devices which are scanned at different scan rates. An optical switching system directs light from the scene alternately in time to the first and second video imaging devices, and makes efficient use of available light from a scene being imaged. In an embodiment of the invention, the optical switching system includes a reflective shutter.

29 Claims, 5 Drawing Figures

HIGH DEFINITION TELEVISION CAMERA SYSTEM AND METHOD WITH OPTICAL SWITCHING

BACKGROUND OF THE INVENTION

This is a continuation-in-part of my U.S. patent application Ser. No. 661,656, filed 10-17-84, which is a continuation-in-part of my U.S. patent application Ser. No. 597,482, filed 4-6-84, which is a continuation-in-part of my U.S. patent application Ser. No. 483,126, filed 4-8-83, which is, in turn, a continuation-in-part of my U.S. patent application Ser. No. 418,055, filed 9-14-82, (now U.S. Pat. No. 4,517,597).

This invention relates to techniques for producing television signals and, more particularly, to an apparatus and method for producing electronic video signals representative of a scene, the signals including a high definition component that has a reduced bandwidth.

As described in the above-identified copending applications Ser. Nos. 418,055 (now U.S. Pat. No. 4,517,597), 483,126 and 597,482, an electronic video signal (television signal) can be encoded at reduced bandwidth by lowering the frame refresh rate of the high spatial frequency components, while maintaining the frame refresh rate of at least a portion of the low spatial frequency components at the standard rate. If done in a specified manner, this will not cause substantial degradation in the ultimately displayed image, since human vision cannot perceive changes in high spatial resolution information at as fast a rate as it can perceive changes in low spatial resolution information. Accordingly, as has been previously set forth, an electronic video encoding and decoding system can be devised which takes advantage of this, and other, characteristics of human vision by encoding higher spatial resolution video components to be at a temporal information rate which approximately corresponds to the highest rate actually perceived by human vision for such components; thereby eliminating the need to encode these components at a higher rate, which inherently wastes bandwidth. Also, as shown in the prior copending applications, the low spatial resolution information can be generated in a form which is compatible with standard television video, e.g. NTSC video.

In the above-referenced copending U.S. patent application Ser. No. 661,656, there is disclosed a camera system and method for directly generating the desired reduced bandwidth electronic video signals. The camera system includes first and second video imaging devices which are scanned at different scan rates. Optical means, such as a beam splitter, directs light from the scene to the first and second video imaging devices.

It is an object of the present invention to provide improvement on said camera system and method.

SUMMARY OF THE INVENTION

In an embodiment as set forth in the above-referenced U.S. application Ser. No. 661,656, there is provided a video camera apparatus for generating video signals representative of images of a scene. First and second video imaging devices are provided. Optical means, comprising a beam splitter, are provided for directing light from the scene to the first and second video imaging devices. Means are provided for scanning the first video imaging device at a relatively fast scan rate, typically, but not necessarily, a conventional 30 frames per second. Means are also provided for scanning the second video imaging device at a relatively slow scan rate, preferably not greater than 15 frames per second. Further means can be provided for recording, and/or transmitting, and/or displaying the outputs of the video imaging devices after further processing. A high definition image can be reconstructed from the recorded and/or transmitted signals.

In one embodiment of the referenced invention, the first video imaging device is a standard resolution color camera (employing, for example, three solid state imagers, or three camera tubes, for RGB) and the second video imaging device is a high resolution monochrome camera, preferably progressively scanned.

In accordance with the improvement of the present invention, means are provided for directing light from the scene alternately in time to the first video imaging device and the second video imaging device. In the illustrated embodiment, the means for directing light comprises a reflective rotatable shutter which operates at a rate of 60 hertz; i.e., 60 times a second it alternates between allowing light from the scene to pass to the second video imaging device (the high resolution monochrome imaging device) and reflecting light from the scene to the first video imaging device (the standard, or low, resolution color imaging device).

The present invention makes efficient use of the available light from the scene, and is compatible with considerations of sensitivity, relative exposure time, and dynamic resolution of the video imaging devices. These advantages are described further hereinbelow.

Shutters are commonly employed in film cameras, the shutter typically being a mirror which diverts the image onto a viewfinder. Certain solid state camera chips, such as CCD camera chips, use a shutter to prevent exposure during the time that the video signal is being read from the light sensitive regions to the storage regions. Shutters have also been employed in television cameras to improve dynamic response. In these cases the shutter prevents a portion of the light from contributing to the main image. In the present invention, the shutter is always directing light to at least one of the video imaging devices, and since both of these devices contribute to the ultimately reconstructed high definition image, there is little wasted light energy as a result of the shuttering operation. Also, the shutter cycle can be selected to provide proportions of light energy to the first and second video imaging devices to obtain desired signal-to-noise ratios. Further, the shuttering operation improves dynamic resolution, which is particularly important in the low resolution portion of the image, since the temporal response of the human eye is more sensitive with respect to the lower spatial resolution components of an image.

Further features and advantages of the invention will become more readily apparent from the following detailed description when taken in conjunction with the accompanying drawings.

DESCRIPTION OF THE PREFERRED EMBODIMENTS

Figure 1:
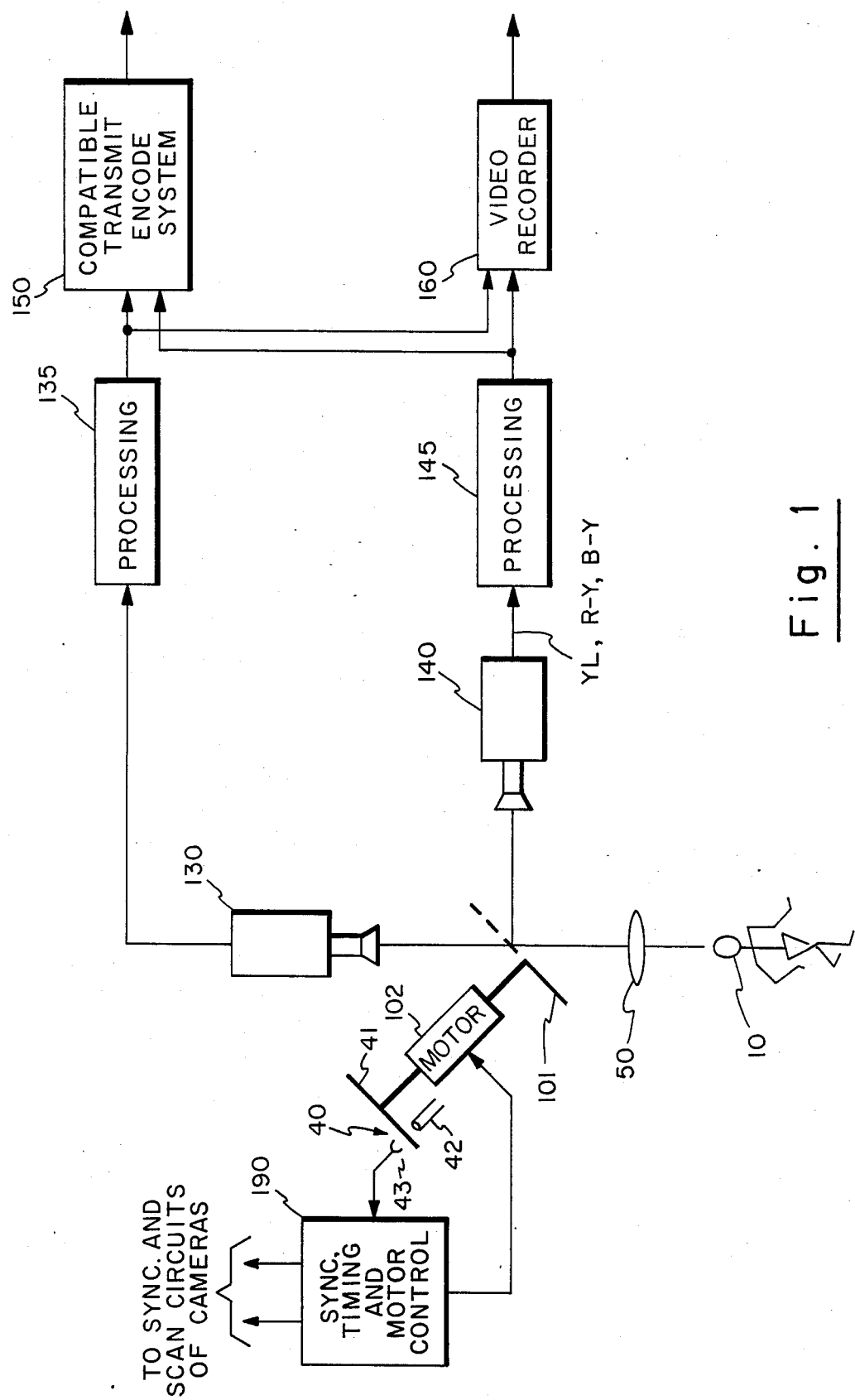
FIG. 1 is a block diagram, partially in schematic form, of an apparatus in accordance with an embodiment of the invention, and which can be used to practice the method of the invention.

FIG. 1 illustrates an embodiment of a video camera system with high definition capability, in accordance with a form of the invention. Light received from a scene 10 is directed, in a manner to be described, to video image sensors 130 and 140 which, in this illustrated embodiment, are television cameras. The camera 140 can be a standard (e.g. 525 line for RGB) resolution color television camera operating at a standard scan rate; i.e. at 30 interlaced frames (two interlaced fields per frame) per second. The camera 140 may employ camera tubes or solid state imagers. The outputs of camera 140 are designated as the standard or low resolution luminance signal, YL, and color difference signals, R−Y and B−Y. The television camera 130, in this embodiment, is a high definition monochrome television camera which may have, for example, 1,050 lines of resolution (as compared to the standard 525 lines of resolution for camera 140). The high resolution camera 130 is scanned at a slower scan rate than the other camera; for example a scan rate of 7.5 or 15 frames per second.

As described in detail in copending U.S. patent application Ser. No. 597,482, assigned to the same assignee as the present application, two different types of neuron systems or channels are used in vision. One type of neuron system, which detects low resolution imagery, is relatively sensitive to temporal transients and has a time constant for build-up and decay of information that is believed to be about 40 to 80 milliseconds. A second type of neuron system is apparently used for transmitting relatively high resolution information from the fovea. This neuron system is believed to have a composite persistence and masking time constant of about 200 to 350 milliseconds. These channels have been referred to as "transient" "sustained" neuron systems. The sustained system is specialized for pattern detection. It has a relatively poor temporal response but relatively good resolution. The transient system is specialized for motion detection. It has relatively poor resolution but relatively good temporal response. In addition to the normal response, a transient caused by motion reduces perception in both systems for a period of about 300 milliseconds. As described in the referenced copending U.S. patent applications, an encoding system can be designed to have spatial and temporal characteristics which match the human visual system, and results in a saving of bandwidth. In the system described in copending U.S. application Ser. No. 661,656, the characteristics of the camera system, along with spatial and/or temporal filtering, provide this match, and other advantages.

Referring again to FIG. 1, the outputs of the television cameras 130 and 140 are respectively coupled to processing circuitry designated by the blocks 135 and 145, the respective natures of which are described in the copending U.S. application Ser. No. 661,656, incorporated herein by reference. The high definition luminance signal output from processing circuitry 135, and the low (or standard) resolution luminance and color difference signals output from processing circuitry 145 are shown in FIG. 1 as being coupled to transmit circuitry 150 and to video recording circuitry 160. The processing circuitry 145 can include a temporal filter, as described in the referenced copending U.S. application Ser. No. 661,656, which has an enhanced temporal response in the temporal frequency range in which the human eye has maximum responsiveness.

The described type of camera system, which utilizes high and low (or standard) resolution video image sensors, such as the two television cameras of FIG. 1, scanned at different rates, has a number of operational advantages, as noted in the referenced copending application, including the following:

(a) Since it is not necessary to derive the low (or standard) resolution information from a fast scan (e.g. the 30 frames per second conventional scan rate) of a high resolution camera (since such information can be obtained from the separate low resolution camera scanned at the standard scan rate), the high resolution camera can be scanned at the slow scan rate (for example, 7.5 or 15 frames per second) at which the high resolution information is to be recorded and/or transmitted. Accordingly, there is more time for light to be integrated at each elemental area of the camera's photosensitive surface; thereby enhancing the signal-to-noise ratio of the high resolution signal. Also, it is not necessary to subsequently reduce the frame refresh rate of the high definition information to obtain the desired reduced bandwidth high definition components for recording and/or transmission. [It may be desirable in some circumstances, however, to "oversample" the high definition signal, and then temporally integrate down to a lower frame rate.]

(b) As described in the abovereferenced copending U.S. patent applications, due to the characteristics of human vision it is not necessary to present the color information with as much spatial or temporal resolution as the luminance information. Accordingly, the high resolution camera can be a monochrome camera, thereby reducing expense and complexity.

(c) Since a conventional interlaced scan can be used for the low (or standard) resolution camera, a progressive (non-interlaced) scan can be used for the high definition camera, thereby resulting in enhanced high resolution performance under certain circumstances.

The present invention provides further improvement by making efficient use of light from the scene while being compatible with considerations of imager sensitivity, relative exposure time, and dynamic resolution of the video imaging devices.

In accordance with the improvement of the present invention, a reflective rotating shutter 101 is positioned in the path of light received from a scene 10, via optics represented by lens 50. Depending upon the rotational orientation of shutter 101, light from the scene is either passed directly to camera 130 or is reflected to camera 140. The reflective rotating shutter is rotated by rotational drive means which, in the Figure, is represented by motor 102 that is under control of a signal from sync and timing circuitry 190.

Figure 2:
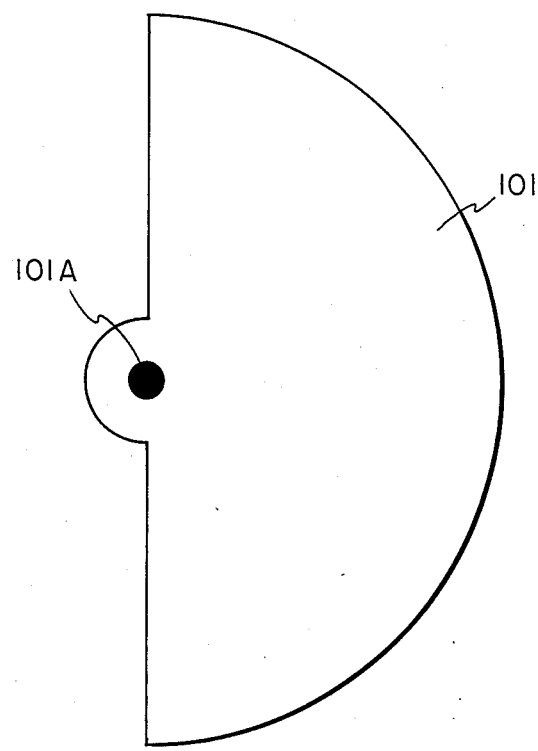
FIG. 2 shows a rotatable reflective shutter as used in the FIG. 1 embodiment.
Figure 3:
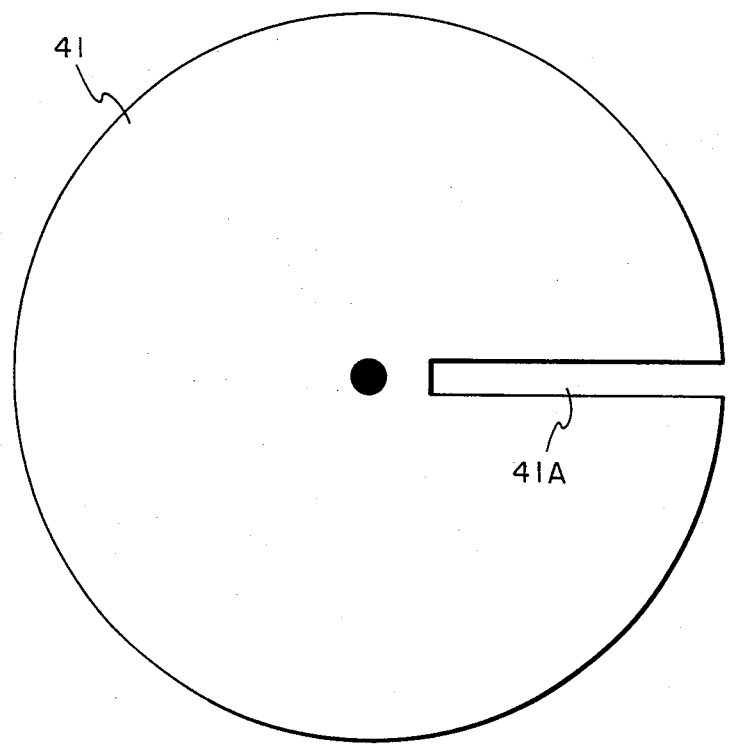
FIG. 3 shows the encoder disk of the optical encoder as used in the FIG. 1 embodiment.

An embodiment of the rotatable reflective shutter is shown in FIG. 2. In the illustration, a mirror of semicircular shape is utilized, and driven on its axis 101A, by the motor 102. In this case, the reflective surface subtends 180 degrees of arc, but other suitable angles greater or less than 180 degrees can be employed, depending upon characteristics of the respective cameras and design considerations, as discussed herein. The motor shaft has an optical encoder 40 associated therewith, the optical encoder including an opaque encoder disk 41 (see FIG. 3) and a light-emitting diode 42 and photodiode 43 on opposing sides of the disk 41. The encoder disk includes a radial slit 41A. The light-emitting diode 42 is energized (by means not shown), and the photodiode produces an output signal, coupled to sync and timing generator 190, each time the slit 41A passes between the light-emitting diode and the photodiode, thereby generating a reference signal for the motor shaft angular position and the shutter angular position. The manner in which this signal is utilized is described below.

Figure 4:
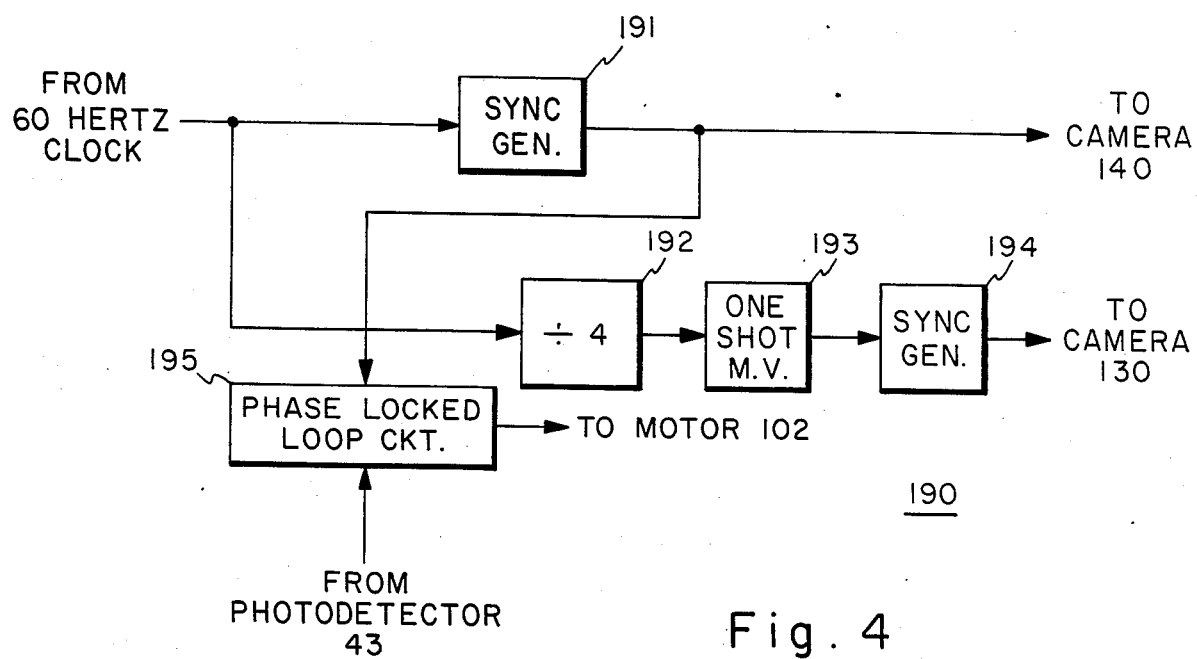
FIG. 4 is a block diagram of the sync, timing, and motor control circuit of the FIG. 1 embodiment.

Referring to FIG. 4, there is shown a block diagram of the sync, timing, and motor control circuit 190, in accordance with the present embodiment of the invention. A signal from a sixty hertz clock is coupled to a sync generator 191 for the low (or standard) resolution camera 140. The sixty hertz clock signal is also coupled to a divide-by-four frequency divider 192 whose output is coupled to a one-shot multivibrator 193 whose output is, in turn, coupled to a sync generator 194 for the high resolution camera 130. The outputs of the sync generators 191 and 194 are utilized to generate the synchronizing and scanning signals for the cameras 140 and 130, respectively, in known manner. The output of sync generator 191 is also coupled to a phase locked loop 195 which produces an output DC level that is used for driving motor 102 (FIG. 1). The phase locked loop also receives, as a phase control signal, the reference position signal from the photodetector 43 (FIG. 1) of the optical encoder 40.

Figure 5:
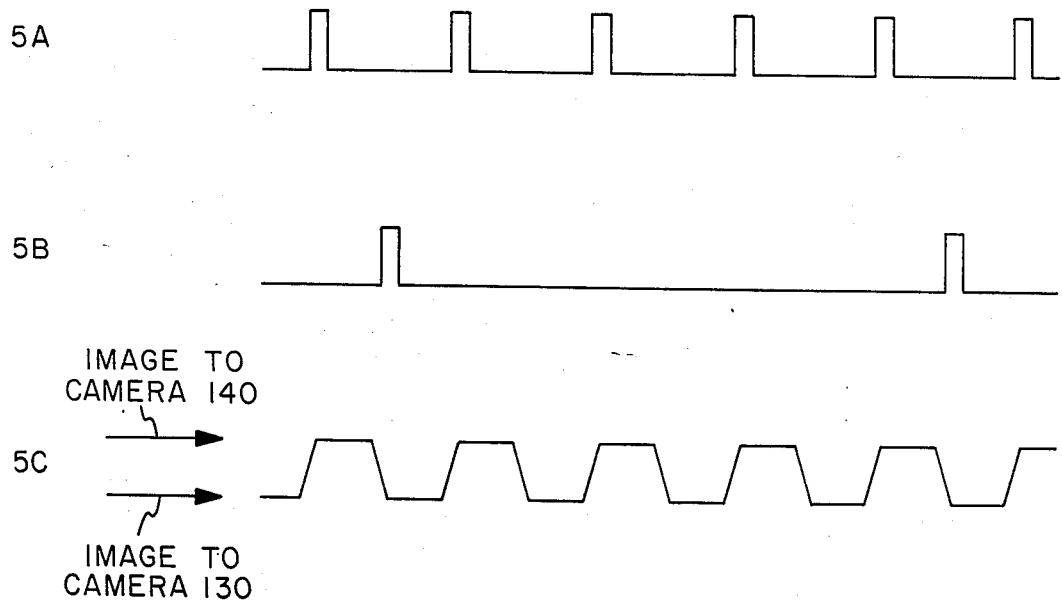
FIG. 5 which includes graphs 5A, 5B and 5C, illustrates the nature of signals utilized and the shutter status in the described embodiment of the invention.

FIG. 5 illustrates the nature of signals in the FIG. 4 circuitry in relationship to the status of the reflective rotating shutter 101, as controlled by the motor 102. Graph 5A illustrates the vertical sync signals, as taken at the output of the sync generator 191, these signals being at a 60 hertz rate in the present embodiment. These signals are also coupled to the phase locked loop 195 associated with motor 102 so that the motor rotates at a 60 hertz rate. This is seen from graph 5C, which shows the status of shutter 101 (driven by the motor), which alternately, at 60 hertz, either allows the image to be passed to camera 130, or reflects the image to camera 140. The rise and fall ramps on this graph indicates the times during which a portion of the image is going to both cameras. The phase of the rotation is also adjusted, using the output signal from the optical encoder, such that the vertical synchronizing signal occurs at a point in the shutter rotational cycle when the light from the image is all going to high resolution camera 130. (This is readily done by preadjusting the angular positions of the shutter and the encoder disc.) In this manner, the vertical retrace of camera 140 is set to occur when no light from the image is going to camera 140. The one-shot multivibrator 192 is set to cause the vertical sync signal to camera 130 (graph 5B) to occur at fixed time with respect to the 60 hertz reference, such that the vertical retrace of the camera 130 starts when no light from the image is going to camera 130.

It will be understood that the shutter can be designed to direct light to the cameras for respective fractions of a time cycle that take account of the relative sensitivities and exposure times of the imaging devices being employed. For example, since the high resolution camera is scanned at a slower scan rate, if all other things were equal, the shutter could direct light to the high resolution camera for a smaller percentage of the cycle, to obtain the same signal-to-noise ratios for the high and low resolution cameras. (If the low resolution camera is a color camera, and the high resolution camera a monochrome camera, as in the described preferred embodiment, the light the low resolution camera receives will be shared between the imaging devices for the different color components, which would further skew the balance toward having more light go to the low resolution camera.) However, other factors, such as the sensitivity and relative aperature sizes of the imaging devices, also come into play. For example, if the high resolution monochrome camera is a saticon, and if the low resolution camera uses three solid state CCD imaging devices (which are much more sensitive than saticons), one would want more light to go to the high resolution camera to better balance signal-to-noise ratios. If the high resolution camera also has a larger imaging surface (and therefore less light-per-unit-area for a given amount of light) more light to the high resolution camera would also be warranted. In the described embodiment, these factors yield a cycle with about equal exposure times for the low and high resolution cameras.

The invention has been described with reference to a particular embodiment, but variations within the spirit and scope of the invention will occur to those skilled in the art. For example, in the referenced copending U.S. application Ser. No. 661,656, there is shown a camera system employing four solid state imaging devices with one of the devices being displaced from the others by one diagonal pixel position so as to obtain a diagonally sampled high resolution signal component. The present invention can have application to that configuration and other camera system configurations.

I claim:
1. Video camera apparatus for generating video signals representative of images of a scene, comprising:
   a first video imaging device;
   a second video imaging device;
   means for directing light from said scene alternately in time to said first video imaging device and said second video imaging device;
   means for scanning said first video imaging device at a relatively fast frame rate; and
   means for scanning said second video imaging device at a relatively slow frame rate;
   components of the outputs of said first and second video imaging devices being combinable to obtain a high definition video signal.

2. Apparatus as defined by claim 1, wherein said relatively fast frame rate is 30 frames per second, and said relatively slow frame rate is not greater than 15 frames per second.

3. Apparatus as defined by claim 1, wherein said second video imaging device has a higher spatial resolution than said first video imaging device.

4. Apparatus as defined by claim 2, wherein said second video imaging device has a higher spatial resolution than said first video imaging device.

5. Apparatus as defined by claim 1, wherein said means for directing light is adapted to operate at a rate synchronized with said first video imaging device.

6. Apparatus as defined by claim 2, wherein said means for directing light is adapted to operate at a rate synchronized with said first video imaging device.

7. Apparatus as defined by claim 4, wherein said means for directing light is adapted to operate at a rate synchronized with said first video imaging device.

8. Apparatus as defined by claim 2, wherein said means for directing light operates at a rate of 60 hertz.

9. Apparatus as defined by claim 7, wherein said means for directing light operates at a rate of 60 hertz.

10. Apparatus as defined by claim 1, wherein said means for directing light is adapted to be directing light to said second video imaging device during periods of time which include the vertical blanking periods of said first video imaging device.

11. Apparatus as defined by claim 5, wherein said means for directing light is adapted to be directing light to said second video imaging device during periods of time which include the vertical blanking periods of said first video imaging device.

12. Apparatus as defined by claim 1, wherein said means for directing light comprises a reflective shutter.

13. Apparatus as defined by claim 5, wherein said means for directing light comprises a reflective shutter.

14. Apparatus as defined by claim 12, wherein said reflective shutter is a rotatable mirror which has a reflective portion in the path of said light to reflect said light toward one of said video imaging devices during a part of a rotational cycle of said mirror, and which has an open portion in the path of said light during another part of said rotational cycle to permit said light to be directed to the other of said video imaging devices.

15. Apparatus as defined by claim 13, wherein said reflective shutter is a rotatable mirror which has a reflective portion in the path of said light to reflect said light toward one of said video imaging devices during a part of a rotational cycle of said mirror, and which has an open portion in the path of said light during another part of said rotational cycle to permit said light to be directed to the other of said video imaging devices.

16. Apparatus as defined by claim 1, further comprising means for combining components of the outputs of said first and second video imaging devices.

17. Apparatus as defined by claim 1, further comprising means for transmitting the outputs of said first and second imaging devices.

18. Apparatus as defined by claim 1, further comprising means for recording the outputs of said first and second imaging devices.

19. Apparatus as defined by claim 1, wherein said first video imaging device comprises a color television camera and said second video imaging device comprises a monochrome television camera.

20. Apparatus as defined by claim 4, wherein said first video imaging device comprises a color television camera and said second video imaging device comprises a monochrome television camera.

21. Apparatus as defined by claim 1, further comprising means for temporally filtering the output of said first video imaging device with a temporal filter that has enhanced temporal response in the temporal frequency range in which the human eye has maximum responsiveness.

22. Apparatus as defined by claim 4, further comprising means for temporally filtering the output of said first video imaging device with a temporal filter that has enhanced temporal response in the temporal frequency range in which the human eye has maximum responsiveness.

23. A method for generating video signals representative of images of a scene, comprising the steps of:
   directing light from the scene alternately in time to first and second video imaging devices;
   scanning the first video imaging device at a relatively fast frame rate; and
   scanning the second video imaging device at a relatively slow frame rate;
   components of the outputs of said first and second video imaging devices being cominable to obtain a high definition video signal.

24. The method as defined by claim 23, wherein said relatively fast frame rate is 30 frames per second and said relatively slow frame rate is not greater than 15 frames per second.

25. The method as defined by claim 24, wherein said directing of light from the scene alternately in time to said first and second video imaging devices is performed at a frequency of 60 hertz.

26. The method as defined by claim 23, further comprising the step of combining the outputs of said first and second video imaging devices.

27. The method as defined by claim 23, further comprising the step of transmitting the outputs of said first and second video imaging devices.

28. The method as defined by claim 23, further comprising the step of recording the outputs of said first and second video imaging devices.

29. The method as defined by claim 23, further comprising temporally filtering the output of said first video imaging device with a temporal filter that has enhanced temporal response in the temporal frequency range in which the human eye has maximum responsiveness.

* * * * *